(12) United States Patent
Avilés-Casco et al.

(10) Patent No.: US 9,741,346 B2
(45) Date of Patent: Aug. 22, 2017

(54) ESTIMATION OF RELIABILITY IN SPEAKER RECOGNITION

(71) Applicant: AGNITIO, S.L., Madrid (ES)

(72) Inventors: Carlos Vaquero Avilés-Casco, Madrid (ES); Luis Buera Rodriguez, Madrid (ES); Jesús Antonio Villalba López, Zaragoza (ES)

(73) Assignee: AGNITIO, S.L., Madrid (ES)

( * ) Notice: Subject to any disclaimer, the term of this patent is extended or adjusted under 35 U.S.C. 154(b) by 0 days.

(21) Appl. No.: 14/778,020

(22) PCT Filed: Apr. 23, 2014

(86) PCT No.: PCT/EP2014/058174
§ 371 (c)(1),
(2) Date: Sep. 17, 2015

(87) PCT Pub. No.: WO2014/173919
PCT Pub. Date: Oct. 30, 2014

(65) Prior Publication Data
US 2016/0307572 A1    Oct. 20, 2016

(30) Foreign Application Priority Data

Apr. 26, 2013  (EP) ..................................... 13165466

(51) Int. Cl.
*G10L 15/00* (2013.01)
*G10L 15/14* (2006.01)
(Continued)

(52) U.S. Cl.
CPC .............. *G10L 17/10* (2013.01); *G10L 15/01* (2013.01); *G10L 15/083* (2013.01); *G10L 17/04* (2013.01);
(Continued)

(58) Field of Classification Search
CPC ..... G10L 15/142; G10L 15/20; G10L 15/144; G10L 15/065; G10L 15/14; G10L 15/063;
(Continued)

(56) References Cited

U.S. PATENT DOCUMENTS 5,864,810 A * 1/1999 Digalakis ................ G10L 17/00
704/254
6,205,426 B1 * 3/2001 Nguyen ................ G10L 15/065
704/251

(Continued)

OTHER PUBLICATIONS

Donald E. Maurer, John P. Baker, Fusing multimodal biometrics with quality estimates via a Bayesian belief network, Pattern Recognition, vol. 41, Issue 3, Mar. 2008, pp. 821-832.*

(Continued)

*Primary Examiner* — Edgar Guerra-Erazo
(74) *Attorney, Agent, or Firm* — Marshall, Gerstein & Borun LLP

(57) ABSTRACT

A method for estimating the reliability of a result of a speaker recognition system concerning a testing audio and a speaker model, which is based on one, two, three or more model audios, the method using a Bayesian Network to estimate whether the result is reliable. In estimating the reliability of the result of the speaker recognition system one, two, three, four or more than four quality measures of the testing audio and one, two, three, four or more than four quality measures of the model audio(s) are used.

12 Claims, 8 Drawing Sheets

| (51) | Int. Cl. | |
|---|---|---|
| | G10L 17/10 | (2013.01) |
| | G10L 17/04 | (2013.01) |
| | G10L 17/06 | (2013.01) |
| | G10L 15/01 | (2013.01) |
| | G10L 15/08 | (2006.01) |
| | G10L 17/12 | (2013.01) |
| | G10L 17/20 | (2013.01) |

(52) U.S. Cl.
CPC .............. *G10L 17/06* (2013.01); *G10L 17/12* (2013.01); *G10L 17/20* (2013.01)

(58) Field of Classification Search
CPC ... G10L 2015/081; G10L 17/00; G10L 17/04; G01N 7/005
USPC .......................... 704/255, 256, 256.1–256.7
See application file for complete search history.

(56) References Cited

U.S. PATENT DOCUMENTS

| 6,985,860 B2* | 1/2006 | Nakatsuka | ............ | G10L 15/065 |
| | | | | 704/233 |
| 7,006,972 B2* | 2/2006 | Hwang | ................ | G10L 15/063 |
| | | | | 704/244 |

OTHER PUBLICATIONS

V. Pavlovic, A. Garg, J. M. Rehg and T. S. Huang, "Multimodal speaker detection using error feedback dynamic Bayesian networks," Proceedings IEEE Conference on Computer Vision and Pattern Recognition. CVPR 2000 (Cat. No. PR00662), Hilton Head Island, SC, 2000, pp. 34-41 vol. 2.*

Campbell et al., "Estimating and Evaluating Confidence for Forensic Speaker Recognition", MTG Lincoln Laboratory, pp. 1-4.

European Search Report for Application No. EP 13165466, mailed Jun. 25, 2013.

Garcia-Romero et al., "On the Use of Quality Measures for Text-Independent Speaker Recognition", Speech and Signal Processing Group, pp. 1-6.

Harriero et al., "Analysis of the Utility of Classical and Novel Speech Quality Measures for Speaker Verification", ATVS-Biometric Recognition Group, vol. 5558, Advances in Biometrics: Third International Conference, ICB 2009.

International Search Report for Application No. PCT/EP2014/058174, mailed Jun. 25, 2014.

Kryszczuk et al., "Reliability-Based Decision Fusion in Multimodal Biometric Verification Systems", Hindawi Publishing Corporation, EURASIP Journal on Advances in Signal Processing, vol. 2007, pp. 1-9.

Richiardi et al., "A Probabilistic Measure of Modality Reliability in Speaker Verification", ICASSP 2005, pp. 709-712.

Richiardi et al., "Confidence and Reliability Measures in Speaker Verification", Journal of the Franklin Institute 343 (2006), pp. 574-595.

Richiardi et al., "Evaluation of Speech Quality Measures for the Purpose of Speaker Verification", Signal Processing Institute, (EPFL).

Richiardi et al., "Speaker Verification with Confidence and Reliability Measures", IEEE, ICASSP 2006, pp. 641-644.

Villalba et al., "A New Bayesian Network to Assess the Reliability of Speaker Verification Decisions", Communication Technology Group, Interspeech 2013.

Villalba et al., "Reliability Estimation of the Speaker Verification Decision Using Bayesian Networks to Combine Information from Multiple Speech Quality Measures", Communications Technology Group, IberSPEECH 2012, CCIS 328, pp. 1-10.

International Preliminary Report on Patentability and Written Opinion of the International Searching Authority for International Application No. PCT/EP2014/058174, issued Oct. 27, 2015.

* cited by examiner

ESTIMATION OF RELIABILITY IN SPEAKER RECOGNITION

The present application is the US National Phase of international patent application No. PCT/EP2014/058174, filed Apr. 23, 2014, which application claims priority to European Patent Application No. 13165466.7, Apr. 26, 2013. The priority application, EP 13165466.7, is hereby incorporated by reference.

BACKGROUND

Speaker recognition systems have two different applications. They can be used for speaker verification, in which it is confirmed or refused that a person who is speaking is the specified person. In this case, two voice prints are compared. The other application is speaker identification which may be used to decide which of a number of persons whose voice prints are known to the system the person who has been speaking corresponds to. In such systems used for speaker identification, it is possible that the speaker who is speaking is not included in the set of known persons (open set) or they may be operated in such a way that the speakers are always in the set of persons known to the system (closed set). Usually, such speaker recognition systems comprise for every speaker enrolled in the system a speaker model describing the voice print of the speaker (the voice print comprising features typical for the speaker).

In current speaker recognition systems, it may be a problem to identify whether the recognition system provides reliable decisions. In particular, in noisy environments or in case of channel mismatch (a channel being everything between the person speaking and the recording medium), current speaker recognition systems may provide unreliable results. Such a channel mismatch may for example happen if, a voice signal is transmitted in a manner that is not known to the system and has not been used for training.

Several attempts to overcome these problems have been made. Examples are the publications by M. C. Huggins and J. J. Grieco: "Confidence Metrics for Speaker Identification" published in the 7$^{th}$ ICSLP, Denver, Colo., 2002, or the document "Using Quality Measures for Multilevel Speaker Recognition", *Computer Speech and Language,* 2006; 20(2-3):192-209 by D. García-Romero, et al. Further attempts have been made by W. M. Campbell et al. in the document "Estimating and Evaluating Confidence for Forensic Speaker Recognition" in ICASSP 2005; 717-720 and in "Considering Speech Quality in Speaker Verification Fusion" in Inter-speech 2005 by Y. Solewicz and M. Koppel and the two documents by J. Richiardi et al., titled "A Probabilistic Measure of Modality Reliability in Speaker Verification" in ICASSP, 2005 and the document "Confidence and Reliability Measures in Speaker Verification" published in the *Journal of the Franklin Institute* 2006; 343 (6): 574-595.

In some of these approaches Bayesian Networks (BN) are used. One document which may help to understand Bayesian Networks is for example "Pattern Recognition and Machine Learning" by C. Bishop, published in Springer Science and Business Media, LLC, 2006.

A Bayesian Network is a probabilistic graphical model representing a set of (random) variables and their conditional dependencies. Their nodes may represent one or more of observed and/or hidden variables and/or hypotheses and/or deterministic parameters.

A variable depending on another variable will be represented in a Bayesian Network by an arrow pointing from the first variable (parent variable), on which the second variable (child variable) is dependent, to the second (dependent) variable.

Such a network may be trained. With such a (trained) network, given a set of known (observed) parameters, the probability of a hidden variable may be estimated.

Previous works on reliability based on Bayesian Networks may have the disadvantage that the parameters of the Bayesian Network may depend on the speaker recognition threshold (working point), as for example in the publication by Richiardi et al. in the ICASSP '05. In that case, a modification of the working point would require a new and complete Bayesian Network training.

Further problems which may be present in the prior art are, for example, the fact that signal degradation may affect the reliability of the trial different if the trial is target or non-target and/or that for the training process, clean and degraded realizations of the same utterances (which is also called stereo data) may be needed. In particular, this may mean that to train prior art systems it may be necessary to have the training utterances as signals with and without distortions, for example, caused by channels, speaker stress, data quality, convolution, added noise or other influences that degrade data. All these data are not always easy to be provided and sometimes the correlation between the reliability and the signal distortion is unknown.

Finally, the prior art has shown that the reliability of a trial (comparison between one testing audio and one speaker model) is deeper related with the signal quality of both the testing audio(s) and model audio(s) than with individual signal quality of testing audio(s) or model audio(s) only. A speaker model as used in this text is usually built by a speaker recognition system using one, two, three or more model audios.

SUMMARY OF THE DISCLOSURE

Objectives of the present invention are to determine and provide a value describing the reliability of a given trial, modelling the effect of quality measures over the range of the scores, not only in one working point (wherein a working point may e.g. be the speaker recognition threshold of the speaker recognition system(s), which may affect the training process of the solution), and/or use (as much) useful information (as possible) from the speech signal or any other source and/or avoid the use of stereo data during the training of the Bayesian Network (comprising the signal without degradation and the signal with degradation e.g., channel effects, data quality losses, etc).

The invention is intended to overcome at least some of the problems mentioned above. In particular, the results for the reliability of a given trial may be better when the quality of the testing audio and the speaker model are not considered independently.

A speaker recognition system may use a speaker model based on one, two, three or more model audio(s) to calculate a result concerning a testing audio. Such a result may be used in a method according to the invention.

A testing audio is usually a (testing) speech signal comprising e.g. an utterance or a fragment of an utterance, e.g., word or phrase of a speaker. The model audio(s) are usually one, two, three or more (enrolment) speech signals each comprising e.g. an utterance or a fragment of an utterance, e.g., word or phrase of a speaker.

Usually, a speaker model based on one, two, three, or more model audios is used in combination with one testing audio in a speaker recognition system. However, it is also possible to use a speaker model based on one, two, three or more model audios and compare it with a testing voice print based on one, two, three, or more testing audios (or directly with one, two, three, or more testing audios).

When using two, three, or more testing audios, each testing audio can be analysed by the speaker recognition system independently and the results can then be fused, for example, by averaging the result. In other cases, a testing voice print may be extracted from the testing audios first (as a speaker model is usually created from the one, two, three, or more model audios). This approach usually provides more reliable results.

Wherever "a testing audio" or "the testing audio" is mentioned in the following text, it may refer to one testing audio or two, three, or more testing audios or a testing voice print generated from one, two, three, or more testing audios.

The invention comprises a method for estimating the reliability of a result of a speaker recognition system, the result concerning a testing audio and a speaker model, which is based on one, two, three or more model audio(s), the method using a Bayesian Network to estimate whether the result is reliable.

The speaker recognition system may have used the one, two, three or more model audio(s) to build a speaker model based on the one, two, three or more model audio(s) before calculating the result concerning the testing audio and the one, two, three or more model audio(s). The speaker model usually describes the voice print of the speaker once it has been trained or created based on the one, two, three or more model audio(s). In some embodiments, the speaker model may be a model audio or may correspond to one, two, three or more model audio(s).

Reliability may be correlated with some quality measures which may be directly or indirectly derived from the speech signals (e.g. model audio(s) and/or testing audio(s)). These quality measures may be chosen to comprise information about the testing audio and/or the speaker model (the model audio(s)). Usually, the quality measures should describe as much information as possible about the testing audio and/or the speaker model.

For estimating the reliability of the decision of the speaker recognition system one, two, three, four or more than four quality measures of the testing audio and one, two, three, four or more than four quality measures of the model audio(s) are used. Usually, for each of the model audio(s) the one, two, three, four or more than four quality measures are determined separately. In other embodiments, the one, two, three, four or more than four quality measures may be determined from the speaker model. The one, two, three, four or more quality measures of the testing audio are usually the same quality measures as the one, two, three, four or more quality measures of the model audio(s). If P is the number of quality measures (one, two, three, four or more) then from each model and testing audio P quality measures may be extracted.

Then, all the quality measures extracted from the model audios and the testing audio can be directly included in the Bayesian Network. In that case, the number of quality variables would be P times the number of audios involved (the sum of the model audios used herein and number of the testing audios involved). As previously explained, there may be one, two, three or more model audios and one, two, three or more testing audios.

Alternatively, the quality measures from all the model audios may be compressed as if they would originate from one model audio and may then be included into the Bayesian Network that way. From the testing audio, the same number of quality measures may be derived.

If two, three, four or more testing audios are used, their quality measures can be compressed in the same manner as the quality measures from the model audios before the variables describing the P quality measures are used by the Bayesian Network. In that case, two times the number of quality measures used (2P) variables describing quality measures (P describing the model audios and P describing the testing audios) would be used as variables for the Bayesian Network.

Alternatively, a combination of those two previously described methods of introducing the quality measures in the Bayesian Network may be used: for example, it would be possible that while the quality measures are derived from each model audio and used directly in the Bayesian Network, if two, three, four or more testing audios are used, their quality measures may be compressed before they are used, so that the number of quality measures used in the Bayesian Network may be P times the number of model audios plus one. Alternatively, the quality measures of the model audios may be compressed while the quality measures of two, three, or more testing audios may be used uncompressed.

In an alternative case, the quality measures of the testing audio(s) and the model audio(s) may be compressed together so that only one time the number of quality measures P variables are used as input for the Bayesian Network (as if only set of quality measures were present).

The quality measures may be derived from the testing audio and model audio(s) directly and/or indirectly.

The expression "estimating" may be used in this context because the calculation of the reliability may depend e.g. on the training of the Bayesian Network. However, two different Bayesian Networks, which have been trained in the same manner and have the same parameters with the same dependencies, will usually provide (calculate) the same results for the reliability for the same testing and model audios (trial). Thus, the result of the estimating is usually not arbitrary.

The result of the speaker recognition system may be an observed score $\hat{s}_i$ provided by the speaker recognition system. Such an observed score may e.g. be a normalized score or a decision, or it may be a likelihood ratio or log likelihood ratio or a score in a certain range, each of which may optionally be calibrated. An index i may indicate the i-th trial throughout the text. Herein, a trial may correspond to comparing one speaker model and a testing audio. The speaker recognition system usually provides one score per trial. Then the resulting score of the speaker recognition system and the quality measures derived from the speaker model (the one, two, three, four or more model audios) and the testing audio are used as input parameters for the Bayesian Network and are processed by the Bayesian Network.

In other cases, the result of the speaker recognition system may be obtained using the observed score $\hat{s}_i$ provided by the speaker recognition system, and by comparing the observed score $\hat{s}_i$ against a speaker recognition threshold. That way, a Boolean output may be provided. The provided result is usually "true" if the score is higher than the speaker recognition threshold and "false" if the score is lower than the speaker recognition threshold. For results equal to the speaker recognition threshold, the result may be defined as "true" or "false" in a speaker recognition system.

In particular, a method for estimating the reliability of a decision of a speaker recognition system may use a Bayesian Network to estimate the posterior distribution of a hidden score $s_i$ given the observed score $\hat{s}_i$ and the quality measures. Herein, $\hat{s}$ (the observed score) and s (the hidden score) are random variables. Each $\hat{s}_i$ and $s_i$ is a realization of these random variables. Herein, each $\hat{s}_i$ is a realization of $\hat{s}$, and correspondingly each $s_i$ a realization of s.

The hidden score $s_i$ is the score that would be obtained if no degradation had affected the testing audio and the model audio(s) (enrolment speech signals). The hidden score $s_i$ is also referred to as clean score $s_i$ in this text.

The observed score $\hat{s}_i$ is the score provided by the speaker recognition system with the actual testing and model audio(s). The testing audio(s) and the model audio(s) may also be referred to as speech signals in this text when it is clear which speech signal(s) are meant. Parts or all of the speech signals (testing audio(s) and/or model audio(s)) for which the speaker recognition system provides the result may have been degraded.

Such an estimation of the reliability may, for example, allow removing the working point dependence of the Bayesian Network that occurs in other prior art approaches when the reliability is obtained for a trial.

In a method as described above it may be assumed that hidden and observed scores are linearly related, e.g. that, $\hat{s}_i = s_i + \Delta s_i$ wherein $\Delta s_i$ describes the offset (difference) between observed and hidden score.

The offset $\Delta s_i$ (difference) between observed and hidden score follows a distribution defined by one, two or more parameters. These parameters usually depend on the quality state and the nature of the trial. Such a distribution of the offset is usually different depending on the quality measures. For example, for different signal to noise ratios, the distribution of the offset is usually not the same. In addition, it is usually influenced depending on whether the trial is target or non-target.

The Bayesian Network may use as nodes describing observed parameters the N observed scores $\hat{s}_i$ and/or the P groups of quality measures $Q_{pi}$ (wherein P is the number of quality measures and may be 1, 2, 3, 4 or more, $p \in [1,P]$).

The index i indicates the i-th trial. There may be N trials, so that i can be a number between 1 and N ($i \in [1,N]$). N may be 1, 2, 3 or more.

The quality measures $Q_{pi}$ may be independent from each other given certain states of quality $z_i$. The states of quality z are a random variable. Each $z_i$ is a realization of z. Thus, independence may be forced between variables that should be independent from each other.

The Bayesian Network may use as nodes describing hidden parameters one, two, three or more or all of the following:
hidden score(s) $s_i$,
a target or non-target nature of the score for each hidden score, $\theta_i$, (also called (hidden) real trial label or (hidden) real label (of the trial)),
states of quality (quality states) $z_i$
coefficients $\pi_z$ of the discrete distribution describing the states of quality, z;
mean $\mu_{\Delta s}$ and precision, $\Lambda_{\Delta s}$, describing the (optionally Gaussian) distribution of the offset between observed and hidden scores, wherein the mean and precision of $\Delta s$ describe the random variable $\Delta s$; each $\Delta s_i$ is realisation of $\Delta s$;
a mean, $\mu_s$, and precision, $\Lambda_s$, describing the (optionally Gaussian) distribution of the hidden score(s) of the speaker recognition system, wherein the mean and precision again describe the random variable s; each $s_i$ would be a realisation of that random variable;

the coefficients $\pi_z$ which describe the distribution of the random variable z which applies for all trials i (and is thus independent of i); $\pi_z$ may be seen as a K dimensional vector, wherein K is the number of quality states. $\pi_z$ may have elements $\pi_{z_k}$ ($k \in [1,K]$) describing the optionally discrete distribution describing z;
the distributions of the groups of quality measures (optionally Gaussian), wherein there usually is a mean $\mu_{Q_p}$ and precision $\Lambda_{Q_p}$ for each of the P groups of quality, $Q_p$, wherein p may be between 1 and P $p \in [1,P]$; such quality distributions may depend of the state of the quality, z, so that there will be K different distributions; each $Q_{pi}$ is a realisation of $Q_p$;

The quality states may e.g. be a K-dimensional binary vector with elements $z_{ik}$, wherein K is the number of quality states and k may be between 1 and K ($k \in [1,K]$) and K may be 1, 2, 3 or more; $z_{ik}$ is usually a Boolean variable which can be 0 or 1. The quality states are usually states defined by certain ranges of values for the quality measures.

For example, given two quality measures, each having values between $-\infty$ and $+\infty$ (for example, signal to noise ratio from $-\infty$ dB to $+\infty$ dB and UBM log likelihood from $-\infty$ to $\infty$) then it is possible to define several quality states.

For example, given the quality measures of this example, one quality state may be defined by the first variable being smaller than 15 dB and a second variable being smaller than 0. This may be written as z being the vector (1,0,0,0). The second quality state may be defined by the first variable being less than 15 dB and the second variable being larger or equal to 0 (z=(0,1,0,0)). As a third state of quality z=(0,0,1,0), the first variable may be larger or equal to 15 dB and the second smaller than 0. The fourth state of quality may be given by the first variable being larger or equal to 15 dB and the second variable being larger or equal to 0 (z=(0,0,0,1)). In that case, for example, the number of quality states K would be 4. Depending on what conditions are chosen to define these states of quality, the number of quality states is K is defined. The Bayesian Network may also use a deterministic value, namely the hypothesis prior, as a node. The hypothesis prior may be written as $\pi_\theta$, e.g. as $\pi_\theta = (P_T, P_{NT})$ with $P_T + P_{NT} = 1$ and may be deterministic. Herein, $P_T$ may be the target prior and $P_{NT}$ the non-target prior.

$\hat{s}_i$ may be an observed variable dependent on $z_i$, $s_i$, $\theta_i$, $\mu_{\Delta s}$ and/or $\Lambda_{\Delta s}$. $\theta_i$ may be dependent on the (optionally deterministic) $\pi_\theta$, $s_i$ may depend on $\theta_i$, $\Lambda_s$ and/or $\mu_s$ while $\mu_s$ may depend on $\Lambda_s$. $z_i$ may depend on $\pi_z$, $\mu_{\Delta s}$ may depend on $\Lambda_{\Delta s}$, $Q_{pi}$ may be an observed variable dependent on $z_i$, $\mu_{Q_p}$ and/or $\Lambda_{Q_p}$, while $\mu_{Q_p}$ may be dependent on $\Lambda_{Q_p}$. Optionally, there may be no other dependencies between the parameters than the dependencies mentioned before.

From the estimated posterior distributions found by the Bayesian Network, the probability of reliability may be calculated given the observed score $\hat{s}_i$ and the quality measures corresponding to the observed score (usually meaning the quality measures associated with the testing audio and model audio(s) from which the observed score $\hat{s}_i$ has been calculated by the speaker recognition system).

The quality measures are usually also observed. The quality measures may be derived directly from the (testing and/or enrolment) speech signals (testing audio and/or model audio(s)). In other embodiments, the quality measure may be derived from the speech signals partially or completely in an indirect manner and/or partially in a direct manner.

A definitive decision whether the trial is reliable or not may then be taken using a reliability threshold.

Reliability in this context may be defined as follows.

For a trial, i, a speaker recognition system may take the decision $\hat{\theta}_i$, namely, it may decide that the person is the target (meaning that the testing audio was spoken by the assumed person) if the observed score $\hat{s}_i$ is larger than or equal to the speaker recognition threshold of the speaker recognition system ($\hat{s}_i \geq \phi_\theta$). If the observed score $\hat{s}_i$ is smaller than the speaker recognition threshold of the speaker recognition system $\phi_\theta$ ($\hat{s}_i < \phi_\theta$), the person is assumed to not be the target. This may also be written as $$\hat{\theta}_i = \begin{cases} T & \text{if } \hat{s}_i \geq \varphi_\theta \\ NT & \text{if } \hat{s}_i < \varphi_\theta \end{cases},$$

wherein T is the decision, that the person is the target and NT is the decision, that the person is not the target. Alternatively, it may be decided that a person is the target if the observed score is larger than the speaker recognition threshold and not the target if the observed score is smaller than or equal to the speaker recognition threshold.

To determine whether the decision $\hat{\theta}_i$ is reliable, a posterior distribution ($P(s_i|\hat{s}_i, Q_i)$) of the hypothetical hidden score $s_i$ may be calculated with the proposed Bayesian Network given the observed score $\hat{s}_i$ and the quality measures $Q_i$. The values for the posterior distribution of the hypothetical hidden score $s_i$ given $\hat{s}_i$ and the quality measures $Q_i$ may be calculated e.g. as described in the Annex I.

Q is usually a quality measure random variable. Usually it is a vector with P elements, one element per quality measure. $Q_i$ is one realization of Q for the i-th trial. Thus, $Q_i$ is usually also a P element vector. Each element of $Q_i$ may be called $Q_{pi}$.

Then the probability of reliability may be calculated, e.g. using the following expression:

$$P(R_i = \mathcal{R} \mid \hat{s}_i, Q_i) = \begin{cases} P(s_i \geq \varphi_\theta \mid \hat{s}_i, Q_i) = \int_{\varphi_\theta}^{\infty} P(s_i \mid \hat{s}_i, Q_i) ds_i & \text{if } \hat{\theta}_i = T \\ P(s_i < \varphi_\theta \mid \hat{s}_i, Q_i) = \int_{-\infty}^{\varphi_\theta} P(s_i \mid \hat{s}_i, Q_i) ds_i & \text{if } \hat{\theta}_i = NT \end{cases}$$

It may then be decided taking decision $\hat{R}_i$ whether the trial is reliable $\mathcal{R}$ or unreliable U, using a reliability threshold $\phi_R$. $\hat{R}_i$ is considered reliable if the probability of reliability is larger than or equal to the reliability threshold $\phi_R$ and $\hat{R}_i$ is considered unreliable if the probability of reliability is smaller than the probability threshold $\phi_R$.

This may also e.g. be written as $$\hat{R}_i = \begin{cases} \mathcal{R} & \text{if } P(R_i = \mathcal{R} \mid \hat{s}_i, Q_i) \geq \varphi_R \\ U & \text{if } P(R_i = \mathcal{R} \mid \hat{s}_i, Q_i) < \varphi_R \end{cases},$$

wherein the variables have the meaning described above.

Alternatively, the decision may be considered reliable $\mathcal{R}$ if the probability of reliability is larger than the reliability threshold $\phi_R$ and $\hat{R}_i$ may be considered unreliable if the probability of reliability is smaller than or equal to the probability threshold $\phi_R$.

For example, a trial may be considered reliable if the observed score is considered target (e.g. the observed score of the speaker recognition system is higher the speaker recognition threshold) and the probability of the hidden score to be higher than (and optionally equal to) the speaker recognition threshold given the quality measures and the observed score is higher than a given reliability threshold. A trial may also be considered reliable if the observed score is considered non-target (e.g. the observed score of the speaker recognition system is lower than the speaker recognition threshold) and the probability of the hidden score to be lower than the speaker recognition threshold given the quality measures and the observed score is higher than (and optionally equal to) a given reliability threshold.

Otherwise, it may be considered unreliable.

The Bayesian Network used in a method described before may be trained before it is used to estimate the reliability of a result of a speaker recognition system. For training of the Bayesian Network, several develop speech signals may be used. They may or may not or may partially correspond to the enrolment speech signals. In particular, its parameters may e.g. be trained using several develop speech signals from one, two, three, or more than three, in particular more than ten and in particular more than 50 different speakers. In particular, more than 20, e.g. more than 50, e.g. more than 100 develop speech signals may be used for the training.

In addition, these develop speech signals preferably have a high variability in terms of signal quality measures because any (hidden) relations between reliability and signal quality measures not observed during the training of the Bayesian Network are usually not modelled later.

In particular, develop speech signals may thus be recorded or received from two or more different channels, e.g. telephones and computers. They may also comprise one, two, three or more different quality deformations (e.g. background noise, deformation of signal due to data carrier error, random noise). Preferably, two, three, four, or more different data degradations are present in different develop speech signals.

For the training of the Bayesian Network and/or for estimating the reliability of a decision of a speaker recognition system, one, two, three, four or more than four quality measures may be used. The use of two, three, four or more quality measures may be advantageous because it may allow accounting for different kinds of data degradation, thus, e.g. allowing estimating the reliabilities of more signals correctly.

In such a method, the quality measures that are used for the Bayesian Network training and/or for estimating the reliability of a decision of a speaker recognition system may comprise the signal to noise ratio (SNR) and/or the modulation index (MI) and/or the entropy and/or the Universal Background Model Log Likelihood (UBMLLK).

In particular, the signal to noise ratio may use properties of voiced speech intervals. Whereas most parts of the energy of voiced speech may be concentrated in multiples of its pitch frequency, additive noises may have a more uniform frequency distribution. This may allow using time dependent adapted comb filters to estimate clean signal and noise power separately in voiced segments for each frame, where a frame is a small piece of audio extracted by windowing (e.g. Hamming or Hanning windows could be used for that purpose). For example, voiced segment proportions in speech may be high enough to follow noise evolution on a wide range of real applications and provide a frame by frame measure. Such measurements may be computed in short time domain, so that the speech signal is split into small pieces called frames, using some kind of windowing such as e.g. Hamming or Hanning.

This approach may be more robust than other approaches that use silence segments to estimate the noise power, especially against non stationary noises. However, in other embodiments, the silence segments may be used to estimate the noise power, or other methods to estimate the signal to noise ratio may be used.

J. Villalba et al. describe "Comb Filter Ratio for Local SNR Estimation v1.2", in a Technical Report of the University of Zaragoza, Zaragoza, Spain, 2009.

The modulation index, for example explained in the document by J. Villalba, "Detecting Replay Attacks from Far-Field Recordings on Speaker Verification Systems" published in COST 2011 European Workshop, BioID 2011, Brandenburg, 2011, pp. 274-285, Springer Berlin/Heidelberg, may be extracted from the envelope of the signal e.g. in a specified window by computing the ratio of the difference of the maximum and minimum values and the addition of the maximum and minimum values of the envelope. Assuming that voice is a modulated signal, some distortions such as additive noise or convolutional distortions may modify this metric.

Entropy (explained e.g. in J. Villalba et al, "Quality Measure Fusion v1.0 and Entropy Measure v1.0, Technical Report of the University of Zaragoza, Zaragoza, Spain, 2009) may measure the uncertainty about the realization of a random variable. Entropy related to a random variable X with L observations $\{o_1, o_2 \ldots, o_L\}$ and the probability distributions $\{p_1, p_2 \ldots, p_L\}$ may be defined as.

$$H(X) = \sum_{l=1}^{N} p_l \log(p_l)$$

The Universal Background Model Log Likelihood (UBMLLK) (as explained e.g. in the document "Reliability Estimation from Quality Measures In Speaker Verification II"; Technical Report, University of Zaragoza, Zaragoza, Spain, 2011 by J. Villalba and E. Lleida and in the document "Analysis of the Utility of Classical and Novel Speech Quality Measures for Speaker Verification"; in: M. Tistarelli, M. Nixon eds. *Advances in Biometrics*. Vol. 5558, Springer Berlin/Heidelberg; 2009:434-442 by A. Harriero et al.) may indicate the degradation of a speech utterance in terms with its divergence with respect to a given Universal Background Model (UBM). Such a UBM may be the starting point of the speaker recognition system. Thus, an utterance that is well represented by the UBM (high UBMLLK) may reach a satisfactory accuracy.

One or more other quality measures may also be used instead of one or more or in addition to one or more of the above mentioned quality measures.

The Bayesian Network may operate and/or be trained independently of the speaker recognition threshold of the speaker recognition system. Thus, a mere change of the speaker recognition threshold of the speaker recognition system may not make a re-training of the B ayesian Network necessary.

During the training of the Bayesian Network, one or more of the hidden variables may be observed, e.g., be known for the corresponding develop speech signals.

For the training of the Bayesian Network, an Expectation Maximization algorithm (EM) may be used to extract the parameters of the complete model.

A description of the expectation maximization algorithm is given for example in the document "Maximum likelihood from incomplete data via EM algorithm", by A. P. Dempster, in the *Journal of Royal Statistics Society*, 39 (1): 1-38.

The model may for example be a model $M=(\mu_s, \Lambda_s, \mu_{Q_p}, \Lambda_{Q_p}, \pi_z, \mu_{\Delta s k\theta}, \Lambda_{\Delta s k\theta})$. The parameters of the model may be $\mu_s$ and $\Lambda_s$ being mean and precision metrics of the (optionally Gaussian) distribution describing $s_i$, $\mu_{Q_p}$ and $\Lambda_{Q_p}$ being mean and precision metrics of the (optionally Gaussian) distribution describing the observed groups of quality measures $Q_p$, $\pi_z$ being the coefficients of the optionally discreet distribution describing z, $\mu_{\Delta s k\theta}$ and $\Lambda_{\Delta s k\theta}$ being the mean and precision metrics of the (optionally Gaussian) distribution describing $\Delta s_{k\theta}$, which is the offset between observed and hidden scores for a certain θ (target or non-target) and a certain quality state (k). These parameters may e.g. correspond to the parameters of the Bayesian Network described above.

In a Bayesian Network, there may be P groups of nodes comprising $Q_p$, $\mu_{Q_p}$ and $\Lambda_{Q_p}$, wherein P may be the number of quality measures.

There may also be N groups of nodes comprising $\hat{s}_i$, $s_i$, $Q_{pi}$, $\theta_i$ and $z_i$. Herein, N may be the number of trials.

The Bayesian Network may be trained in a supervised manner, unsupervised manner or in a blind manner.

In a supervised manner, Δs and z are observed on training and hidden on testing.

Then $P(\Delta s | z_k=1, \theta)$ and $P(Q | z_k=1)$ may be built for each possible combination of the quality measures. Herein, $P(\Delta s | z_k=1, \theta)$ is the probability distribution of the offset between observed and hidden scores given a certain quality state (k) and a certain kind of trial, namely target or non-target (θ). The second expression $P(Q | z_k=1)$ is the probability distribution of the quality measures given a certain quality state (k). Under this approach, the knowledge of Δs may be required during the training. Thus, clean and degraded signals (stereo data) may be needed during the training. Herein, k may indicate the k-th component of a K dimensional binary vector $z_{ik}$ (the corresponding quality states for trial i). Each element of $z_i$, $z_{i_k}$, may represent one quality state. For each $z_i$, one of its $z_{ik}$ elements will be 1, and the rest will be 0. Then, $z_{ik}=1$ may correspond to indicating that the k-th quality state is considered. This may also be written as $z_k$. This representation may be advantageously in a mathematical notation of the method.

In an unsupervised manner Δs may be observed on training and hidden on testing while z may be hidden on both training and testing. This may be advantageous because it may be less restrictive than the approach described before. However, it is still required that clean and degraded signals (stereo data) be provided.

In a blind manner, Δs and z are hidden on training and testing. This may be advantageous for real situations because it is not required to know the quality state or the corresponding offset between observed and hidden scores during the training. Thus, it may be particularly interesting for many real applications. Parameters may be extracted using a suitable algorithm, e.g. an Expectation Maximization algorithm, e.g. using the expressions provided in Annex II.

Alternatively, an already trained Bayesian Network which may have been trained for a certain case, may also be adapted instead of being trained from scratch. In such an adaptation process, the trained parameters of the Bayesian Network may be adapted based on e.g. some (adaptation) data available for specific circumstances to describe the circumstances better. Such an adapted Bayesian Network may then be used to estimate reliability in a method as described above. This may be particularly useful if the data present for the specific circumstances would not be sufficient for a new training of a Bayesian Network. However, such data may be sufficient for an adaptation. Thus, this may be preferred for cases, where only little data is present.

Several solutions can be considered to adapt a Bayesian Network. One useful solution may be the Maximum A Posteriori (MAP) technique. Several parameters of the BN can be candidates to be adapted, for example, means and precisions which determine the distributions of $P(Q|z)$ $P(\Delta s|\theta,z)$ and $P(s|\theta)$. Further explanations about MAP may be found in Annex (III), and in Chin-Hui Lee and Jean-Luc Gauvain, "MAP Estimation of Continuous Density HMM: Theory and Applications", *Proceedings of DARPA Speech & Nat. Lang.* 1992.

The Bayesian Network in a method as described before may use one, two, three or more quality measures and usually the score (or result) of the speaker recognition system as input for training and/or computing a reliability. Usually, these quality measures are provided by one, two or more different systems.

Using a method as described above, a reliability of the decision of the speaker recognition system may then be computed using for example one, two, three, four or more usually previously computed and provided quality measures and usually also the score (or result) of the speaker recognition system.

In a method as described above, the reliability may be used to make a decision. Based on the reliability, a decision may be made whether the trial was reliable or not. This decision may optionally be made by discarding unreliable trials based upon the reliability.

Alternatively, the decision may optionally be made by transforming a (calibrated) likelihood ratio (LR) or a (calibrated) log likelihood ratio (LLR) or a (calibrated) score provided by the speaker recognition system.

These (calibrated) likelihood ratios or (calibrated) log likelihood ratios provided by the speaker recognition system may be transformed depending on the reliability. For example, the likelihood ratio may be moved to 1 (or if the speaker recognition system provides log LR (LLR), the LLR may be moved to 0) if the probability or reliability of a trial $P(R_i = \Re | \hat{s}_i, Q_1)$ is too low, e.g. lower than a certain predetermined threshold.

Alternatively, the score provided by the speaker recognition system, may be transformed into a (calibrated) likelihood ratio or into a (calibrated) log likelihood ratio or a (calibrated) score using a function dependent on the score provided by the speaker recognition system and the reliability estimated by the Bayesian Network. Thus, instead of transforming a (calibrated) likelihood ratio provided by the speaker recognition system, in a speaker recognition system providing an observed score instead of a likelihood or log likelihood ratio, the score may also be transformed into a (calibrated) likelihood ratio, or (calibrated) log likelihood ratio or a (calibrated) score, dependent on the reliability in the Bayesian Network.

Another solution for the transformation of (calibrated) likelihood ratios may be a method comprising computing the transformed likelihood ratio $LR_{trans}$ (or a transformed log likelihood ratio or a transformed score) as a function of the likelihood ratio (or log likelihood ratio or score) provided by the speaker recognition system and the posterior probability (reliability). This may e.g. be written as $LR_{i,trans} = f(LR_i, P(R_i = \Re | \hat{s}_i, Q_i))$. The function used for such a transformation ($f$) (the transformation function), may e.g. a discriminative linear function defined by a set of parameters that may have been trained in a develop phase.

Another possibility for using the reliability calculated by the proposed Bayesian Network would be to fuse several speaker recognition systems. If one trial audio has been analysed by several speaker recognition systems, the scores from all of them may be fused giving more importance to those with higher reliability. A possibility would e.g. be to weigh the scores by the reliability. This may e.g. be done using the formula $$s_{fused} = \frac{\sum_{j=1}^{J} \hat{s}_j P(R_i = \Re | \hat{s}_j, Q_j)}{\sum_{j=1}^{J} P(R_i = \Re | \hat{s}_j, Q_j)}$$

Herein J may represent the number of speaker recognition systems. j may be between 1 and J and identify one particular speaker recognition system of the J speaker recognition systems, wherein J may be 1, 2, 3 or more. In this case, it is assumed that all the scores of the speaker recognition systems are confined in the same range, e.g., between 0 and 1. If that is not the case, additional compensation terms may be added to the above mentioned expression to bring them into the same range, for example, normalising all the speaker recognition scores of the different systems.

A method according to the invention as described above may be used for speaker verification and/or for speaker identification because every trial is considered independently.

The invention further comprises a computer readable medium comprising computer readable instructions for executing a method as described above when executed on a computer. The invention also comprises a system adapted to execute a method as described above.

BRIEF DESCRIPTION OF THE SEVERAL VIEW OF THE DRAWINGS

Further details of the invention are explained in the following figures.

FIG. 4(*b*) shows a second training method for training a Bayesian Network;

FIG. 4(*c*) shows a third training network for training a Bayesian Network;

DETAILED DESCRIPTION OF THE PREFERRED EMBODIMENTS

Figure 1:
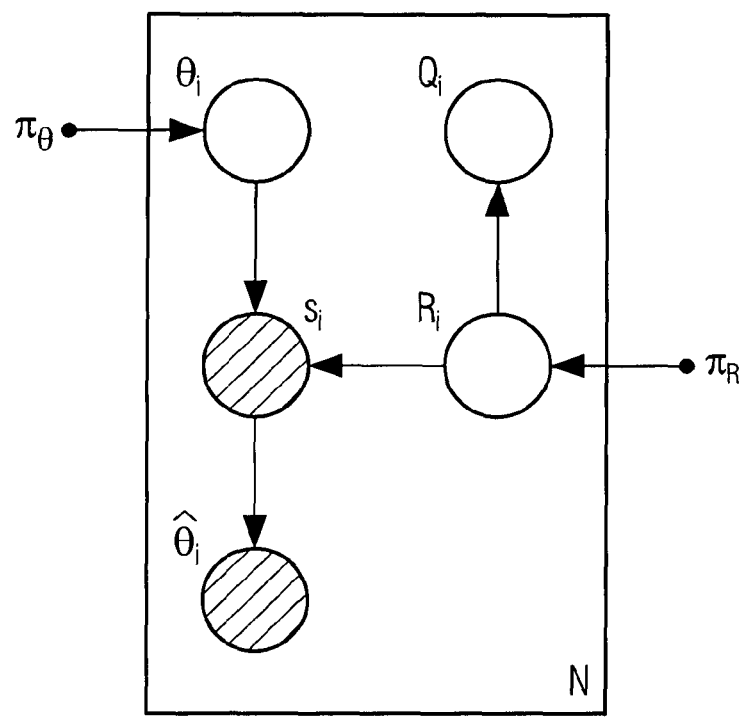
FIG. 1 shows a Bayesian Network as used in the prior art.

FIG. 1 shows a Bayesian Network used for example in the document "A probabilistic measure of modality reliability in speaker verification", published in Acoustics, Speech and Signal Processing, 2005, Proceedings, (ICASSP '05), IEEE International Conference in 2005 by J. Richiardi et al. In it, empty nodes denote hidden variables, shaded nodes denote observed variables and a small solid node denotes a deterministic parameter. A node or group of nodes surrounded by a box (called a plate) labelled with N indicates that there are N nodes of that kind, for example N trials. The arcs between the nodes point from the parent to the children variables, representing the conditional dependencies between parents and children. Herein a parent variable corresponds to a variable on which a corresponding variable called children variable depends. The expressions used in FIG. 1 are known e.g. from the Bishop reference cited previously.

The variables used in FIG. 1 are the following. $s_i$, is the observed speaker verification score, $Q_i$ represents the observed speech quality measures related to one trial (only SNR in the previous mentioned document). $\theta_i \in \{T, NT\}$ is the hidden label of trial, where T is the hypothesis that the training and testing audio belong to the same speaker and NT is the hypothesis that the training and testing audio belong to different speakers. $\hat{\theta}_i$ is the observed speaker recognition decision for the i-th trial, which is marked by the i subscript, after applying a threshold $\xi_\theta$. $R_i \in (\Re; U)$ is the hidden reliability of the trial, where $\Re$ is the hypothesis that the decision is reliable and U unreliable. $\pi_\theta = (P_T, P_{NT})$ is the deterministic hypothesis prior where $P_T$ is the target prior and $P_{NT} = 1 - P_T$ the non-target prior. Finally, $\pi_R = (P\Re, P_U)$ is the deterministic reliability prior. Using the Bayesian Network, it is possible to compute the posterior distribution of $R_i$ given the observed and deterministic variables $P(R_i | s_i, Q_i, \hat{\theta}_i, \pi_\theta, \pi_R)$.

Such a model may have the disadvantage that the parameters of the Bayesian Network may depend on the speaker verification threshold $\xi_\theta$. Thus, a change of the threshold may make re-training necessary, which may not be an option or may not be advantageous in many real cases.

Figure 2:
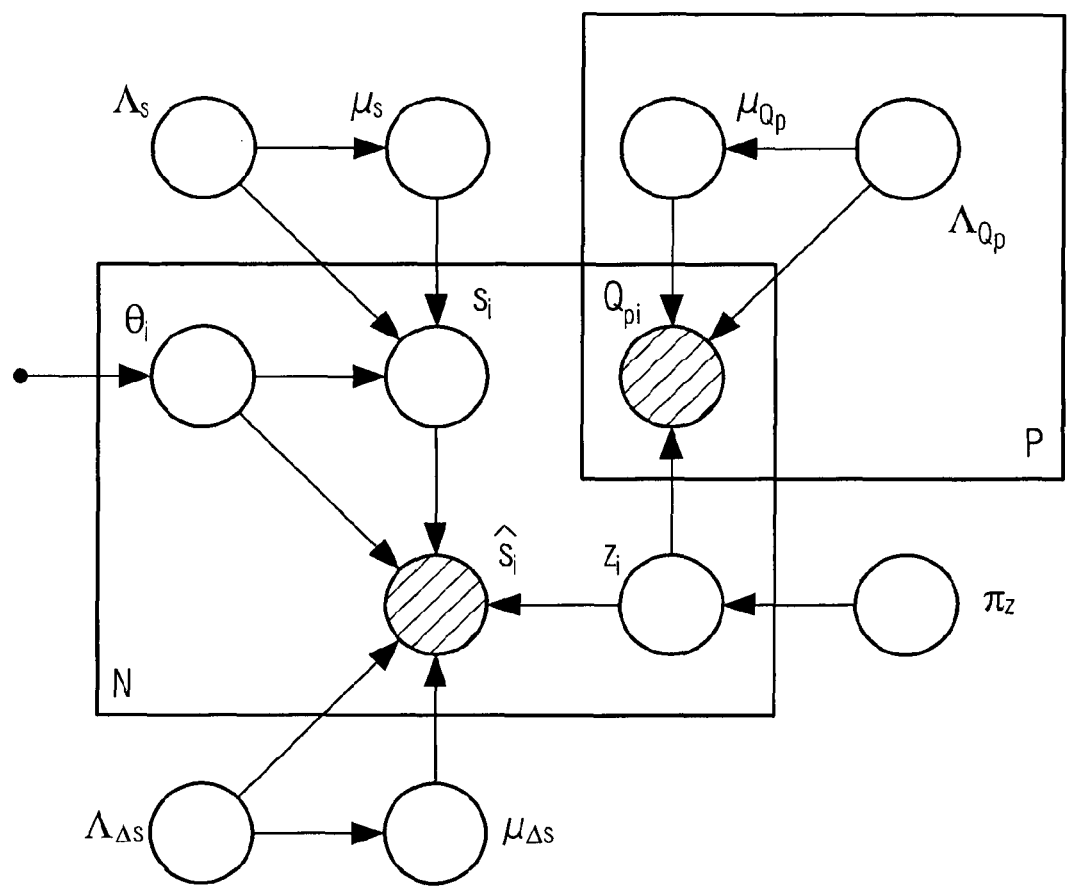
FIG. 2 shows a Bayesian Network which may be used for a method according to the invention.

FIG. 2 shows a Bayesian Network which may be used in some embodiments of the invention. In it, empty nodes denoted hidden variables, shaded nodes denote observed variables and a small solid node denotes a deterministic parameter. Again a group of nodes surrounded by a box (called plate) labelled with the letter either N or P indicates that there are N or P group of nodes of that kind. In this example, there may be N trials and P quality measures, wherein N may be 1, 2, 3 or more and wherein P may be 1, 2, 3, 4 or more.

A Bayesian Network which may be used for a method as described before may use or comprise some or all of the following components and variables:

$\hat{s}_i$ is the observed score provided by the speaker recognition system. The testing audio and the model audio(s) may have been degraded. In general, such an $\hat{s}_i$ may be a vector of scores from different speaker recognition systems. In other embodiments it may be a scalar variable. The subscript i which may be between 1 and number of trials N ($i \in [1,N]$), may represent the trial.

Whenever a variable has a subscript i, it means that this a realization of a random variable. Such a realization is called as the corresponding variable but has the additional subscript i which the random variable does not have. For example, $\hat{s}_i$ is a realization of $\hat{s}$.

$s_i$ is the clean score which may be a vector of clean scores e.g. of different speaker recognition systems. It may be a scalar variable in other embodiments. The subscript i which may be between 1 and number of trials N ($i \in [1,N]$), may represent the trial. Such a clean score would correspond to the score provided by a speaker recognition system without any degradation of the testing audio and model audio(s). In a general case, such a clean score may be a hidden variable. However, if the method comprises a training of the Bayesian network, depending on the training, the clean score may be observed in the training phase. In particular, if an artificially degraded database is used for example by adding additive noises or convolutional distortion to the signals, a clean score may be observed in the training phase. The distribution of the s under the condition $\theta$ may be assumed to be Gaussian. $P(s|\theta) = N(s; \mu_{s_\theta}, \Lambda_{s_\theta}^{-1})$ where $\theta$ is the real trial label, which can be target or non target ($\theta \in (T,NT)$). $\mu_{s_\theta}$ and $\Lambda_{s_\theta}^{-1}$ are the mean and variance (inverse of precision) of the (usually Gaussian) distribution which clean scores associated to $\theta$ follow.

Furthermore, the relationship between clean hidden and observed scores may be modelled following the expression $\hat{s}_i = s_i + \Delta s_i$. $\Delta s_i$ may be the offset (difference) between the observed (noisy) score and the clean (hidden) score.

$\pi_\theta$ is the hypothesis prior $\pi_\theta = (P_T, P_{NT})$ with $P_T + T_{NT} = 1$ and may be deterministic. Herein, $P_T$ may be the target prior and $P_{NT}$ the non-target prior. The target prior is the prior probability of a target trial. This may be considered as the probability of a target trial without knowing anything about a trial.

$z_i$ are the states of quality (quality states) associated to i-th trial. It is a K-dimensional binary vector with elements $z_{ik}$ with k between 1 and the number of quality states K ($k \in [1,K]$).

$z_i$ is usually a binary vector. Given $z_i$ usually only one element will be equal to 1, while the others are 0. There may be K quality states. Thus, the element $z_{ik}$ which is equal to 1 determines the quality state associated to the i-th trial, the k-th in this case.

Although the quality measures are usually continuous variables, the combination of all of them may be discretized and affect the distribution of $\Delta s_1$. The distribution of z is given $$\text{by } P(z) = \prod_{k=1}^{K} (\pi_{z_k})^{z_k}.$$

$\pi_z$ are the coefficients of the optionally discrete distribution describing z. $\pi_z$ is usually a K-dimensional vector with elements $\pi_{z_k}$, wherein $\pi_{z_k}$ is usually the probability of the k-th quality state (which usually is the probability of $z_k$).

$\pi_z$ may be a variable of the Bayesian network and is usually obtained during the training phase of the Bayesian Network. There may also be other variables of the Bayesian Network that are trained during the training phase. K-dimensional z determines one quality state. When it is associated with a trial, it is usually called $z_i$.

Thus, the probability of z is usually $\pi_{z_k}$, wherein $z_k$ is the element of z which is 1. This may e.g. be expressed as given above $$P(z) = \prod_{k=1}^{K} (\pi_{z_k})^{z_k}.$$

$Q_{pi}$ are the observed quality measures. It is considered that there are P groups of quality measures that are independent from each other given $z_i$ ($p \in [1,P]$). This may allow forcing independence between variables, e.g. variables that should not be correlated. Herein, i may be the number of the trial, and p may run between 1 and the number of quality measures P. If $Q_p$ is modelled by Gaussians this may be the same as having a Gaussian block diagonal covariance matrix. Herein, $Q_p$ describes the observed quality measures. When they refer to a particular trial, they are referenced as $Q_{pi}$.

This set may be denoted as $Q_i = \{Q_{pi}\}_{p=1}^{P}$.

$\mu_{Q_p}$ and $\Lambda_{Q_p}$ are the mean and precision (usually described by a matrix) of the usually Gaussian distributions that describe $Q_p$. There are K different distributions, as many as quality states so that:

$$P(Q | z_k = 1) = \prod_{p=1}^{P} N(Q_p; \mu_{Q_{pk}}, \Lambda_{Q_{pk}}^{-1})$$

$\mu_{\Delta s}$ and $\Lambda_{\Delta s}$ are the mean $\mu_{\Delta s}$ and precision $\Lambda_{\Delta s}$ (usually described by a matrix) of the usually Gaussian distribution that describes $\Delta s$. There are 2K different distributions, one for each quality state and $\theta$.

So, $P(\hat{s}|s, z_k=1, \theta) = N(\hat{s}; s+\mu_{\Delta s_{k\theta}}, \Lambda_{\Delta s_{k\theta}}^{-1})$.

Therein, there may be N groups of nodes comprising the variables $\hat{s}_i$, $s_i$, $Q_{pi}$, $z_i$ and $\theta_i$ (one group for each $i \in [1,N]$) and P groups of nodes comprising the variables $Q_{pi}$, $\mu_{Q_p}$ and $\Lambda_{Q_p}$ (one group for each $i \in [1,P]$). In particular $\hat{s}_i$ may be dependent on $z_i$, $s_i$, $\theta_i$, $\mu_{\Delta s}$ and $\Lambda_{\Delta s}$. $\theta_i$ may be dependent on the (optionally deterministic) $\pi_\theta$, $s_i$ may depend on $\theta_i$, $\Lambda_s$, $\mu_s$ while $\mu_s$ may depend on $\Lambda_s$. $z_i$ may depend on $\pi_z$, $\mu_{\Delta s}$ may depend on $\Lambda_{\Delta s}$, $Q_{pi}$ may be an observed variable dependent on $z_i$, $\mu_{Q_p}$ and $\Lambda_{Q_p}$, while $\mu_{Q_p}$ may be dependent on $\Lambda_{Q_p} \cdot \hat{s}_i$ and $Q_{pi}$ may be observed, $\Lambda_{\Delta s}$, $\mu_{\Delta s}$, $\Lambda_s$, $\mu_s$, $\theta_i$, $s_i$, $\Lambda_{Q_p}$, $\pi_z$, $z_i$ and $\mu_{Q_p}$ may be hidden variables and $\pi_\theta$ may be deterministic.

In the Bayesian Network described above, p will usually assume values between 1 and P, and i will usually assume values between 1 and N.

Herein, P is the number of quality measures and N the number of trials.

Figure 3:
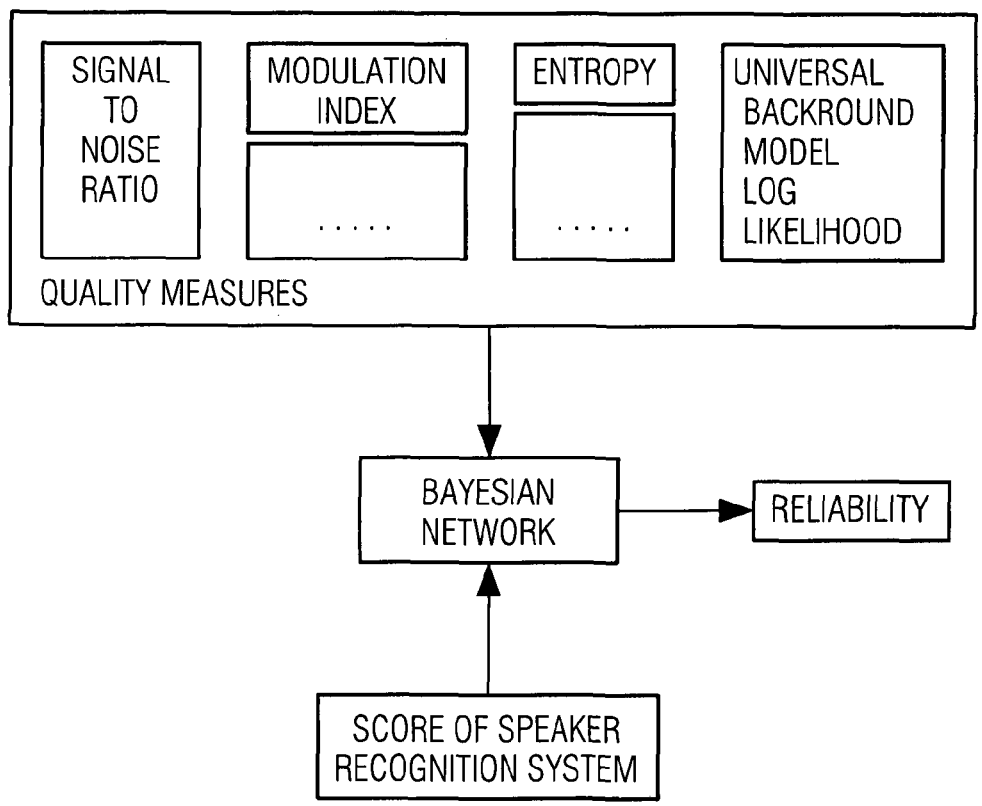
FIG. 3 shows possible input parameters to a Bayesian Network.

FIG. 3 shows a diagram showing the input and output parameters of the Bayesian Network. In particular, the score of a speaker recognition system and the chosen quality measures are used by the Bayesian Network, for example, to calculate (estimate) the reliability. In other embodiments, these input parameters may be used for the training of the Bayesian Network. In particular, in this shown case, the quality parameter, signal to noise ratio, modulation index, entropy and Universal Background Model log likelihood are explicitly mentioned. It is indicated in the figure that other quality parameters may be additionally used.

In other embodiments, only one, two, three or four of the mentioned quality measures may be used or any number of the shown quality measures may be used in combination with any other quality measures not shown here.

As a result, the reliability $P(R_i = \Re | \hat{s}_i, Q_i)$ of the result of the recognition system may be estimated (calculated), usually for a particular testing audio and particular model audio(s). The result may for example be that the probability of the decision of a trial which has e.g. been found by comparing the observed score calculated by the speaker recognition system with a threshold is reliable.

To calculate that reliability, additionally the speaker recognition threshold used by the speaker recognition system and/or a reliability threshold will usually have to be provided as input parameters for the Bayesian Network as well (not shown).

FIG. 4 shows three different training methods which may be used to train the Bayesian Network.

In particular, the Bayesian Network may be trained using stereo develop data (data wherein the degraded and clean data is present) in a supervised training. In it, $\Delta s$ and z are observed during the training. The parameters are extracted using expectation maximization or any other suitable algorithm (FIG. 4 (a)).

FIG. 4 (b) shows a different training approach for a Bayesian Network. In it, stereo data develop (comprising clean data and degraded data) is used in an unsupervised training. In such training, $\Delta s$ may be observed during the training while z may be hidden during the training. Again, the parameters of the model may be extracted using a suitable algorithm, like for example expectation maximization algorithm.

Figures 4A, 4B, 4C:
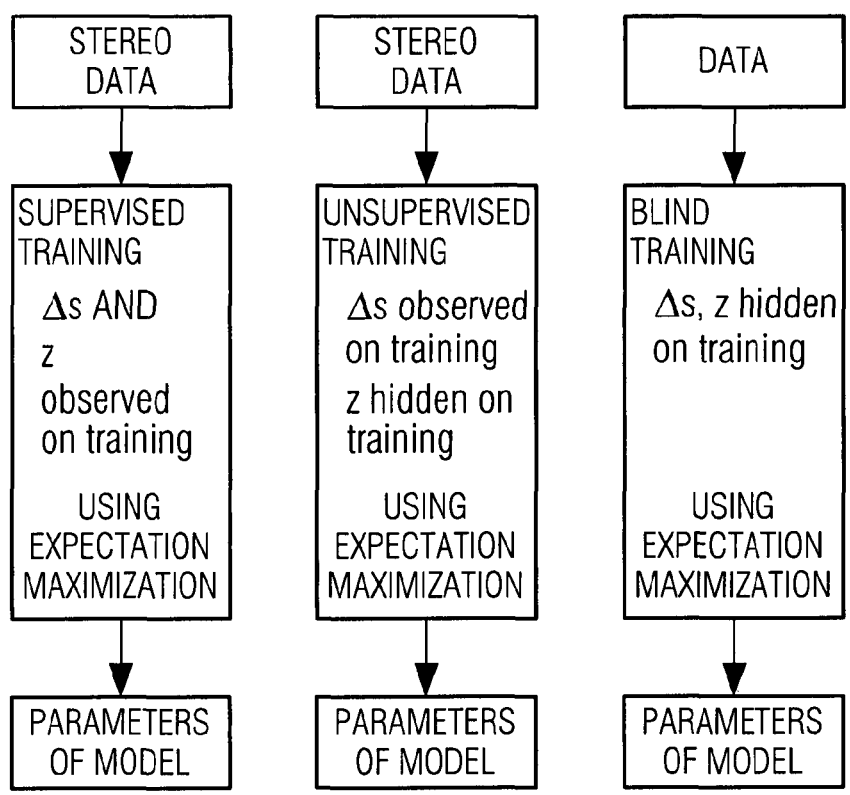
FIG. 4(*a*) shows at first training method for training a Bayesian Network.

FIG. 4 (c) shows blind training of the Bayesian Network. In particular, it may not be necessary to provide stereo data. The data used for the training the Bayesian Network in blind training is usually degraded. Any degradation not seen in the develop speech signals will usually not be modelled by the Bayesian Network. This is usually also true for other training methods, for example as described with regard to FIGS. 4a and 4b. Usually, the accuracy of the Bayesian Network depends on the mismatch between developed data used to train to the Bayesian Network and testing data. With low mismatch, the accuracy of the Bayesian Network will be high, and vice versa.

In blind training, $\Delta s$ and z are hidden variables on the training. The parameters are extracted using a suitable algorithm like for example expectation maximization algorithm.

Figure 5:
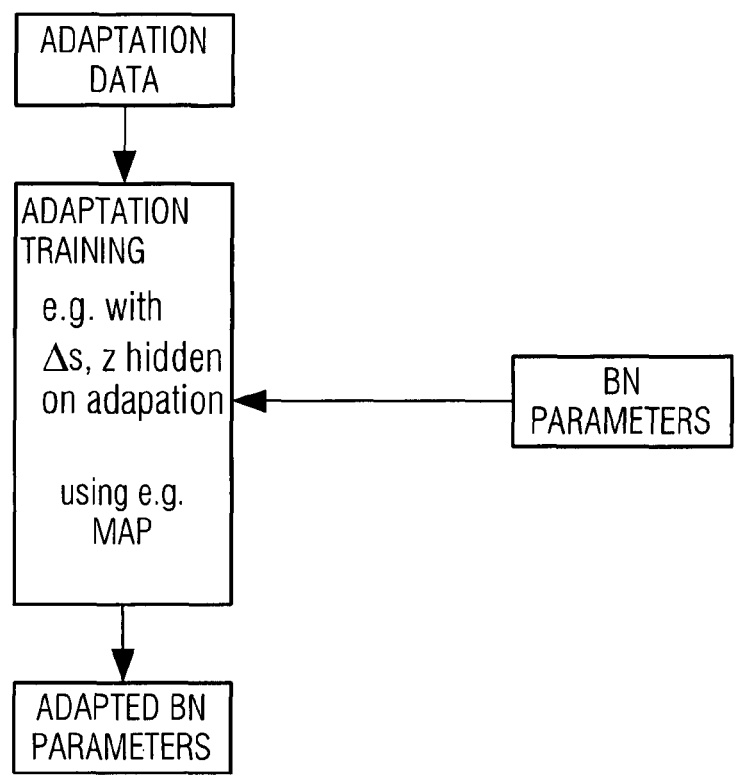
FIG. 5 shows steps which may be used for adaptation of a Bayesian Network.

FIG. 5 shows steps which may be used in a method according to the invention for the adaptation of a Bayesian Network (its parameters). Starting from adaptation data and using the parameters of a Bayesian Network which has already been trained, the Bayesian Network (its parameters) can be adapted. The adaptation data may comprise the observed score(s) ($\hat{s}_i$) provided by the speaker recognition system from the adaptation data and one, two, three or more quality measures from audios used for the adaptation. Usually, the adaptation data comprises all quality measures derived from the one or more audio(s) used for the adaptation that are considered in the Bayesian Network and the observed score(s) provided by the speaker recognition system. Usually, the quality measure(s) and/or the score(s) are not computed from the audio(s) in the adaptation training, but e.g. before the adaptation training. During the adaptation training $\Delta s$ and z may be hidden.

Such an adaptation may for example be done using maximum a posteriori algorithm (MAP).

With such an approach, after the adaptation, an adapted set of parameters of the Bayesian Network may be present. Thus, the Bayesian Network may then be used with the adapted parameters.

Such an adaptation process may be particularly useful, if only a small set of model audios are present for the situation for which the model should be trained. Then, the result which may be achieved by using an already trained Bayesian Network and adapting its parameters/adapting the Bayesian Network, may be more reliable than starting the training process with the (limited) amount of data available for the particular situation from scratch.

Figure 6:
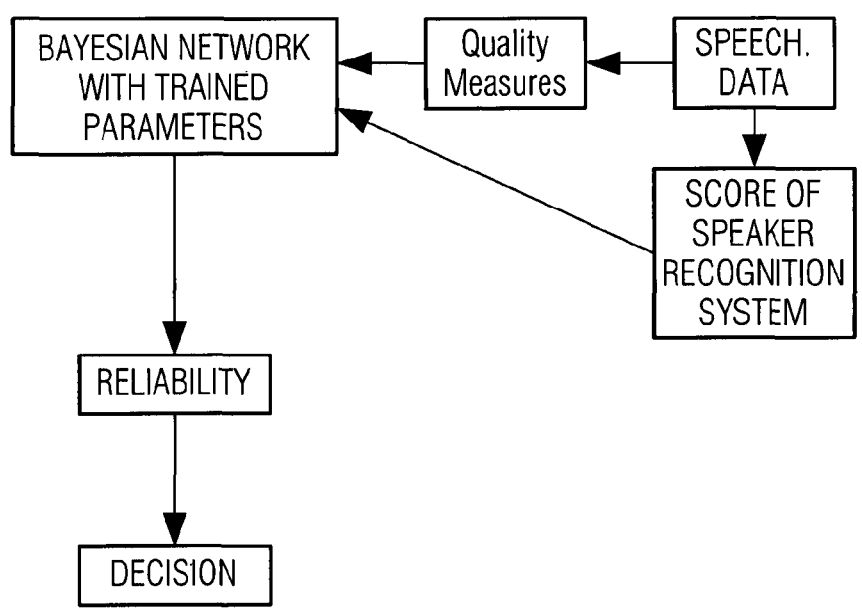
FIG. 6 shows the steps of a method for estimating the reliability of a decision of a speaker recognition system.

FIG. 6 shows the steps of an embodiment of the method of invention. In particular, using quality measures of the testing and model audios and the score of a speaker recognition system which may both be derived indirectly or directly from the testing and model audios, the Bayesian Network with trained parameters may compute the reliability and make a decision based on that reliability. Usually, "speaker" recognition threshold and/or a reliability threshold are needed to make a final decision.

As explained above, such a decision may for example be a discarding of a trial if the decision is unreliable, a transformation of the score, for example by using one of the functions described above for that purpose or fusing of several systems (all of these are not shown in FIG. 6).

For example, a score obtained by the speaker recognition system may be transformed into a transformed likelihood ratio or a transformed log likelihood ratio dependent on reliability to obtain a (calibrated) transformed (log) likelihood ratio. Thus, from a speaker recognition system providing a raw score which is not given as a (log) likelihood ratio, the score may be transformed into a (calibrated) transformed likelihood ratio (or a (calibrated) transformed log likelihood ratio LLR or a (calibrated) transformed score in a different format than a (log) likelihood ratio), or from a speaker recognition system providing a (calibrated) likelihood ratio (or a (calibrated) log likelihood ratio) the LR (LLR) may be transformed in view of the reliabilities estimated by the Bayesian Network to result in a (calibrated) transformed LLR or (calibrated) transformed LR (not shown in FIG. 6).

Figure 7:
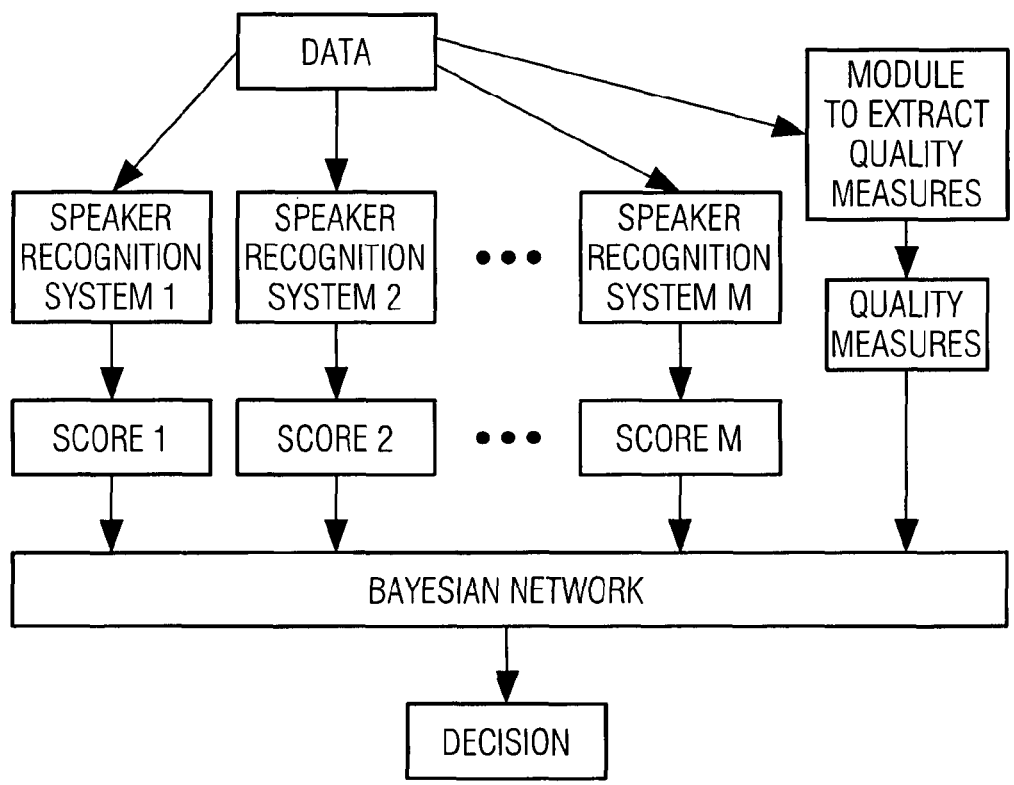
FIG. 7 shows steps which may be comprised in a method according to the invention.

FIG. 7 shows how a final score may be calculated using the reliability of the scores and the scores of the several speaker recognition systems 1 to M (wherein M is the number of different speaker recognition systems and may be 1, 2, 3, 4 or more) in a diagram. This final score may correspond to a decision mentioned for example in FIG. 6. In particular, starting out from the data which is usually a testing audio and a model audio(s), several speaker recognition systems in this case, 1 to M calculate score 1 to M. Herein each speaker recognition system then provides its score to the Bayesian Network. By using the quality measures of testing audio and model audio(s) and the score of the speaker recognition systems, the Bayesian Network then proceeds in making a decision. The quality measures are usually extracted from the data by an external module. This module, however, may also be integrated with the Bayesian Network in other embodiments. The decision may, for example, be a final score which may be considered against the threshold. For making such a decision, another Bayesian Network may be used.

In other embodiments, some other module different from the Bayesian Network may make the decision using input from the Bayesian Network. For example, the scores may be fused by an external module according to their reliability which may be obtained with the explained Bayesian Network.

In particular, a final score may be some combination of weighted scores wherein the scores with a higher reliability are weighted more than the scores with a lower reliability.

In particular, in such a fusion, one Bayesian Network may calculate the reliability for the trials provided by all speaker recognition systems, or two, three, or more Bayesian Networks may be used. In particular, for each score of a speaker recognition system, one Bayesian Network may be used to calculate reliability and then the decision may be taken in the following step (not shown in FIG. 7). Usually, when the speaker identification system is changed, the Bayesian Network has to be retrained. Thus, in some embodiments, two, three, or more Bayesian Networks may be used. In other embodiments, only one Bayesian Network may be used.

Figure 8:
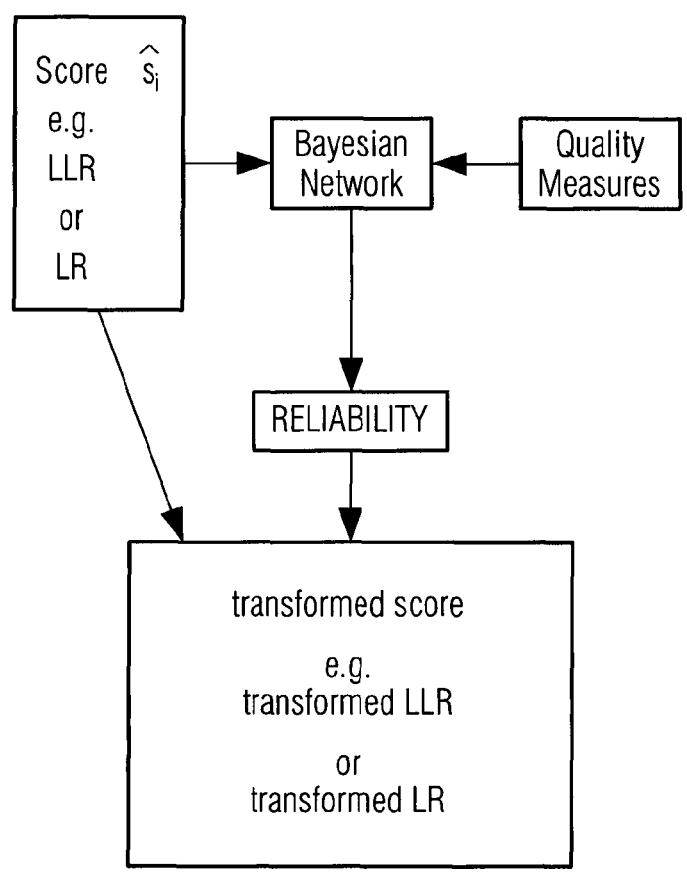
FIG. 8 shows a step which may be comprised in a method according to the invention.

FIG. 8 also shows a step which may be comprised in a method according to the invention. A Bayesian Network may use the input quality measures and the result of a speaker recognition system, for example, an observed score $\hat{s}_i$, e.g. a (calibrated) log likelihood ratio (LLR) or a (calibrated) likelihood ratio (LR) as input. It may then calculate the reliability of the result of the speaker recognition system.

Based on the reliability that is calculated, a decision may then be made. This may for example be made by calculating a (calibrated) transformed likelihood ratio or a (calibrated) transformed log likelihood ratio or a (calibrated) transformed score based on the reliability and the result of the speaker recognition system. However, usually, when the result of the speaker recognition system is a likelihood ratio or a log likelihood ratio, no transformed score in a format different than a (log) likelihood ratio can be calculated.

If a likelihood ratio or log likelihood ratio is the result of a speaker recognition system, using the reliability a (calibrated) transformed likelihood ratio or (calibrated) transformed log likelihood ratio may be calculated as output.

Starting from a likelihood ratio as result of a speaker recognition system, a (calibrated) transformed likelihood ratio or a (calibrated) transformed log likelihood ratio may be calculated. Accordingly, from a log likelihood ratio, a (calibrated) transformed likelihood ratio or a (calibrated) transformed log likelihood ratio may be calculated as a result.

Alternatively a (calibrated) transformed score in a different format than a (log) likelihood ratio may be calculated using $\hat{s}_i$ in a different format than a (log) likelihood ratio.

The transformed likelihood ratio and/or the transformed log likelihood ratio or the transformed score may or may not be calibrated. The log likelihood ratio or the likelihood ratio or the score provided by a speaker recognition system may also be calibrated or may not be calibrated.

The steps of calculating a decision (for example a transformed likelihood ratio or transformed log likelihood ratio or transformed score) based on the result of the speaker recognition system (which may for example be a score $\hat{s}_i$ in a format different than a (log) likelihood ratio or log likelihood ratio or likelihood ratio) using the reliability estimated by the Bayesian Network may be done by a different module or system than a Bayesian Network, wherein the reliability may be provided by the Bayesian Network and the result of the speaker recognition system may be provided by the speaker recognition system as input for the module or system.

ANNEX I

The posterior probability of the hidden score, given the observed score and the quantity measures, $P(s|\hat{s}, Q)$ can be expressed as (a method for calculating the posterior probability of the hidden score given the observed score and the quantity measures may also e.g. be found in J. Villalba: A Bayesian Network for Reliability Estimation: Unveiling the Score Hidden under the Noise, Technical Report, University of Zaragoza, Zaragoza (Spain), 2012):

$$P(s|\hat{s}, Q) = \sum_{\theta \in \{T, NT\}} \sum_{k=1}^{K} P(s, \theta, z_k = 1 | \hat{s}, Q) =$$

$$\sum_{\theta \in \{T, NT\}} \sum_{k=1}^{K} P(s | \hat{s}, Q, \theta, z_k = 1) P(\theta, z_k = 1 | \hat{s}, Q)$$

where $P(s|\hat{s}, Q, \theta, z_k=1)$ can be demonstrated that follows a Gaussian distribution N $(s; \mu'_{s_{k\theta}}, \Lambda'^{-1}_{s_{k\theta}})$, where the mean and the precision are respectively:

$$\Lambda'^{-1}_{s_{k\theta}} = \Lambda_{\Delta s_{k\theta}} + \Lambda_{s_\theta}$$

$$\mu'_{s_{k\theta}} = \Lambda'^{-1}_{s_{k\theta}}(\Lambda_{\Delta s_{k\theta}}(\hat{s} - \mu_{\Delta s_{k\theta}}) + \Lambda_{s_\theta}\mu_{s_\theta})$$

On the other hand, using Bayes rule, $$P(\theta, z_k = 1 \mid \hat{s}, \theta) = \frac{P(\hat{s} \mid Q, z_k = 1)P(Q \mid z_k = 1)P(\theta)\pi_{z_k}}{\sum_{\theta \in \{T,NT\}} \sum_{k=1}^{K} P(\hat{s} \mid \theta, z_k = 1)P(Q \mid z_k = 1)P(\theta)\pi_{z_k}}$$

Where:

$$P(Q \mid z_k = 1) = \prod_{p=1}^{P} N(Q_p; \mu_{Q_{pk}}, \Lambda^{-1}_{Q_{pk}})$$

$$P(\hat{s} \mid \theta, z_k = 1) = N(\hat{s}; \mu'_{s_{k\theta}}, \Lambda'^{-1}_{s_{k\theta}})$$

$$\mu'_{s_{k\theta}} = \mu_{s_\theta} + \mu_{\Delta s_{k\theta}}$$

$$\Lambda'^{-1}_{s_{k\theta}} = \Lambda_{s_\theta}\Lambda'^{-1}_{s_{k\theta}}\Lambda_{\Delta s_{k\theta}}$$

ANNEX II

EM algorithm is an iterative method that estimates the parameters of a statistical model that has some latent variables by using maximum likelihood as objective. The EM iteration alternates between performing an expectation (E) step, which creates a function for the expectation of the log-likelihood evaluated using the current estimate for the parameters, and a maximization (M) step, which computes parameters maximizing the expected log-likelihood found on the E step. These parameter estimates are then used to determine the distribution of the latent variables in the next E step. (A method of using an EM algorithm to extract the parameters of a statistical model may also e.g. be found in J. Villalba: A Bayesian Network for Reliability Estimation: Unveiling the Score Hidden under the Noise, Technical Report, University of Zaragoza, Zaragoza (Spain), 2012.)

Step E

It is the defined variable $\gamma(z_k) = P(z_k = 1 \mid \hat{s}, Q, \theta)$ which can be computed as:

$$\gamma(z_k) = \frac{\pi_{z_k} P(\hat{s} \mid z_k = 1, \theta)P(Q \mid z_k = 1)}{\sum_{k=1}^{K} \pi_{z_k} P(\hat{s} \mid z_k = 1, \theta)P(Q \mid z_k = 1)}$$

$$P(Q \mid z_k = 1) = \prod_{p=1}^{P} N(Q_p; \mu_{Q_{pk}}, \Lambda^{-1}_{Q_{pk}})$$

$$P(\hat{s} \mid \theta, z_k = 1) = N(\hat{s}; \mu'_{s_{k\theta}}, \Lambda'^{-1}_{s_{k\theta}})$$

$$\mu'_{s_{k\theta}} = \mu_{s_\theta} + \mu_{\Delta s_{k\theta}}$$

$$\Lambda'_{s_{k\theta}} = \Lambda_{s_\theta}\Lambda'^{-1}_{s_{k\theta}}\Lambda_{\Delta s_{k\theta}}$$

Step M

Step M provides the new estimation of the model parameters once the step E has been carried out:

$$\pi_{z_k} = \frac{\sum_{i=1}^{N} \gamma(z_{ik})}{\sum_{k=1}^{K} \sum_{i=1}^{N} \gamma(z_{ik})}$$

$$\mu_{Q_{pk}} = \frac{\sum_{i=1}^{N} \gamma(z_{ik})Q_{pi}}{\sum_{i=1}^{N} \gamma(z_{ik})}$$

$$\Lambda^{-1}_{Q_{pk}} = \frac{\sum_{i=1}^{N} \gamma(z_{ik})(Q_{pi} - \mu_{Q_{pk}})(Q_{pi} - \mu_{Q_{pk}})^T}{\sum_{i=1}^{N} \gamma(z_{ik})}$$

$$\mu_{s_\theta} = \frac{\sum_{i=1}^{N} t_{i\theta} E[s_i]}{\sum_{i=1}^{N} t_{i\theta}}$$

$$\Lambda^{-1}_{s_\theta} = \frac{\sum_{i=1}^{N} t_{i\theta} E[s_i s_i^T]}{\sum_{i=1}^{N} t_{i\theta}} - \mu_{s_\theta}\mu_{s_\theta}^T$$

$$\mu_{\Delta s_{k\theta}} = \frac{\sum_{i=1}^{N} t_{i\theta}\gamma(z_{ik})(\hat{s}_i - \mu'_{s_{i_{k\theta}}})}{\sum_{i=1}^{N} t_{i\theta}\gamma(z_{ik})}$$

$$\Lambda^{-1}_{\Delta s_{k\theta}} = \frac{\sum_{i=1}^{N} t_{i\theta}\gamma(z_{ik})(\hat{s}_i - \mu'_{s_{i_{k\theta}}})(\hat{s}_i - \mu'_{s_{i_{k\theta}}})^T}{\sum_{i=1}^{N} t_{i\theta}\gamma(z_{ik})} + \Lambda'^{-1}_{s_{k\theta}} - \mu_{\Delta s_{k\theta}}\mu_{\Delta s_{k\theta}}^T$$

$$\mu'_{s_{i_{k\theta}}} = \Lambda'^{-1}_{s_{k\theta}}(\Lambda_{\Delta s_{k\theta}}(\hat{s}_i - \mu_{\Delta s_{k\theta}}) + \Lambda_{s_\theta}\mu_{s_\theta})$$

$\Lambda'_{s_{k\theta}} = \Lambda_{\Delta s_{k\theta}} + \Lambda_{s_\theta}$ where $t_{i\theta} = 1$ if $\theta_i = \theta$, and $t_{i\theta} = 0$ if $\theta_i \neq \theta$. E is the expectation operator.

ANNEX III

Maximum A Posteriori algorithm is used to adapt the means and covariances of $P(Q|z)$, and $P(\Delta s|\theta, z)$ and $P(s|\theta)$ with few target data. Given the corresponding means and covariances initially included in the Bayesian Network ($\mu_{0,Q_{pk}}, \Sigma_{0,Q_{pk}}, \mu_{0,\Delta s_{k\theta}}, \Sigma_{0,\Delta s_{k\theta}}, \mu_{0,s_{k\theta}}$ and $\Sigma_{0,s_{k\theta}}$), which have been obtained with the develop data; and the means and covariances extracted by the Bayesian Network training procedure with the target data (look at Annex II, $\mu_{ML,Q_{pk}}, \Sigma_{ML,Q_{pk}}, \mu_{ML,\Delta s_{k\theta}}, \Sigma_{ML,\Delta s_{k\theta}}, \mu_{ML,s_{k\theta}}$ and $\Sigma_{ML,s_{k\theta}}$), adapted parameters are obtained by linear regression according the amount of target data:

$$\mu_{Q_{pk}} = \frac{1}{\beta_k}(\beta_0 \mu_{0,Q_{pk}} + N_k \mu_{ML,Q_{pk}})$$

$$\Sigma_{Q_{pk}} = \frac{1}{\rho_k}\left(\left(\rho_0 \Sigma_{0,Q_{pk}} + N_k \Sigma_{ML,Q_{pk}} + \frac{\beta_0 N_k}{\beta_k}\right)\right.$$
$$\left.(\mu_{ML,Q_{pk}} - \mu_{0,Q_{pk}})(\mu_{ML,Q_{pk}} - \mu_{0,Q_{pk}})^T\right)$$

$$\mu_{\Delta s_{k\theta}} = \frac{1}{\beta_k}(\beta_0 \mu_{0,\Delta s_{k\theta}} + N_k \mu_{ML,\Delta s_{k\theta}})$$

$$\Sigma_{\Delta s_{k\theta}} = \frac{1}{\rho_k}\left(\left(\rho_0 \Sigma_{0,\Delta s_{k\theta}} + N_k \Sigma_{ML,\Delta s_{k\theta}} + \frac{\beta_0 N_k}{\beta_k}(\mu_{ML,\Delta s_{k\theta}} - \mu_{0,\Delta s_{k\theta}})\right.\right.$$
$$\left.\left.(\mu_{ML,\Delta s_{k\theta}} - \mu_{0,\Delta s_{k\theta}})^T\right)\right.$$

$$\mu_{s_{k\theta}} = \frac{1}{\beta_k}(\beta_0 \mu_{0,s_{k\theta}} + N_k \mu_{ML,s_{k\theta}})$$

$$\Sigma_{s_{k\theta}} = \frac{1}{\rho_k}\left(\left(\rho_0 \Sigma_{0,s_{k\theta}} + N_k \Sigma_{ML,s_{k\theta}} + \frac{\beta_0 N_k}{\beta_k}\right.\right.$$
$$\left.\left.(\mu_{ML,s_{k\theta}} - \mu_{0,s_{k\theta}})(\mu_{ML,s_{k\theta}} - \mu_{0,s_{k\theta}})^T\right)\right.$$

Where $\beta_0$, $\rho_0$ are the relevant factors for the means and covariances, and $N_k$ is the number of trials belong to a quality state k in the target data. Also, $$\beta_k = N_k + \beta_0$$

$$\rho_k = N_k + \rho_0$$

What is claimed is:

1. A method for estimating the reliability of a result of a speaker recognition system, the result concerning one, two, three or more testing audio(s) or a testing voice print and a speaker model, which is based on one, two, three or more model audios, the method comprising:
using a Bayesian Network to estimate whether the result is reliable, wherein estimating the reliability of the result of the speaker recognition system includes using one, two, three, four or more than four quality measures of the testing audio(s) and one, two, three, four or more than four quality measures of the model audio(s), and wherein using the Bayesian network includes:
using as nodes describing observed parameters an observed score and the quality measures,
using as nodes describing hidden parameters a hidden score, states of quality, coefficients of the distribution describing the states of quality, mean and precision describing the groups of the quality measures, mean and precision describing the distribution of the offset between observed and hidden score, mean and precision describing the distribution of the hidden score, and a real label of a trial, and
using as a node describing a deterministic value a hypothesis prior,
wherein:
the observed score is dependent on at least one of a group consisting of the states of quality, a clean score, a real trial label, the mean and precision of the distribution describing the offset between the observed score and the hidden score,
the real trial label is dependent on the hypothesis prior and the hidden score is dependent on the (hidden) real label of trial and the mean and precision of the distribution describing the clean score,
the states of quality depend on the coefficients of the distribution describing the states of quality,
the observed quality measures depend on the states of quality and the mean and precision of the distribution describing the groups of the observed quality measures.

2. The method according to claim 1, wherein the distribution describing the states of quality is discreet and/or wherein
the mean describing the offset between observed and clean score depends on the precision describing the offset between observed and clean score and/or
wherein the mean describing the quality measures optionally depends on the precision describing the quality measures.

3. The method according to claim 1, further comprising training the Bayesian Network before the Bayesian Network is used to estimate the reliability of the result of the speaker recognition system.

4. The method according to claim 1, wherein for training of the Bayesian Network one, two, three, four or more than four quality measures are used.

5. The method according to claim 1, wherein the quality measures comprise one, two, three or four of the following: signal to noise ratio, modulation index, entropy, universal background model log likelihood.

6. The method according to claim 1, wherein the Bayesian Network is trained using an Expectation Maximization algorithm to extract the parameters of the model.

7. The method according to claim 1, wherein the Bayesian Network is trained in one of the following manners: supervised, unsupervised, blind.

8. The method according to claim 1, wherein the Bayesian Network is adapted in order to describe certain circumstances better.

9. The method according to claim 1, wherein the quality measures are provided by one, two or more systems different from the Bayesian Network.

10. The method according to claim 1, wherein the reliability is used to make a decision, optionally comprising one of the following: discarding unreliable trials, transforming a score, fusing the results of two, three or more speaker recognition systems.

11. The method according to claim 1, wherein the speaker recognition system is used for speaker verification and/or speaker identification.

12. A non-transitory computer readable medium comprising computer readable instructions for executing a method according to claim 1 when executed on a computer.

* * * * *